Oct. 27, 1964    W. B. HAYES III, ET AL    3,154,389
DEVICE FOR CATALYTIC EXHAUST TREATMENT WITH PARTICLE SEPARATION
Filed April 30, 1963    3 Sheets-Sheet 1
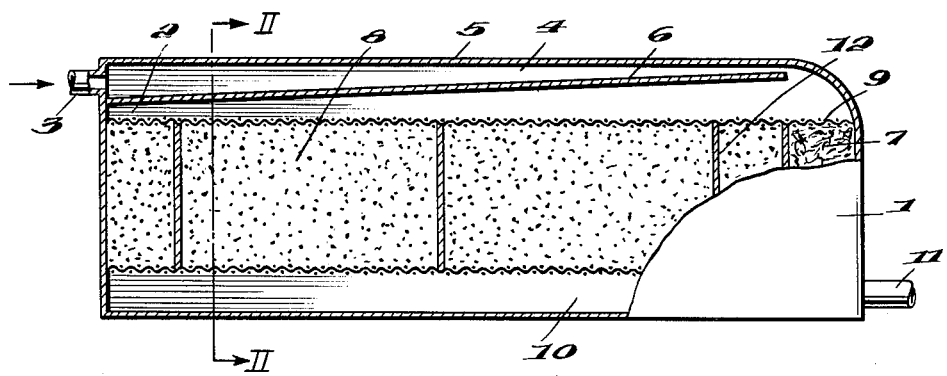
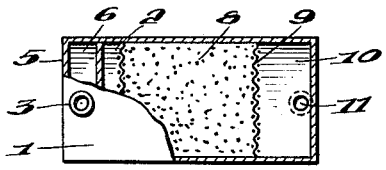
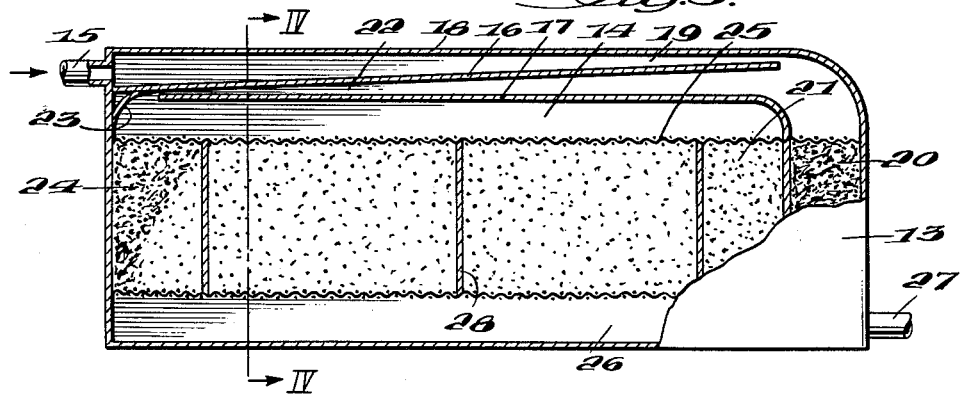
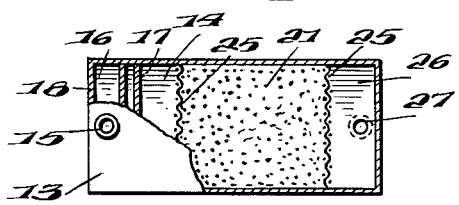
INVENTORS
WILLIAM B. HAYES,
ROBERT J. KALLAL,
CLIFFORD M. SAYRE, JR.
BY
*Albert B. Griggs*
ATTORNEY Oct. 27, 1964    W. B. HAYES III, ET AL    3,154,389
DEVICE FOR CATALYTIC EXHAUST TREATMENT WITH PARTICLE SEPARATION
Filed April 30, 1963    3 Sheets-Sheet 2
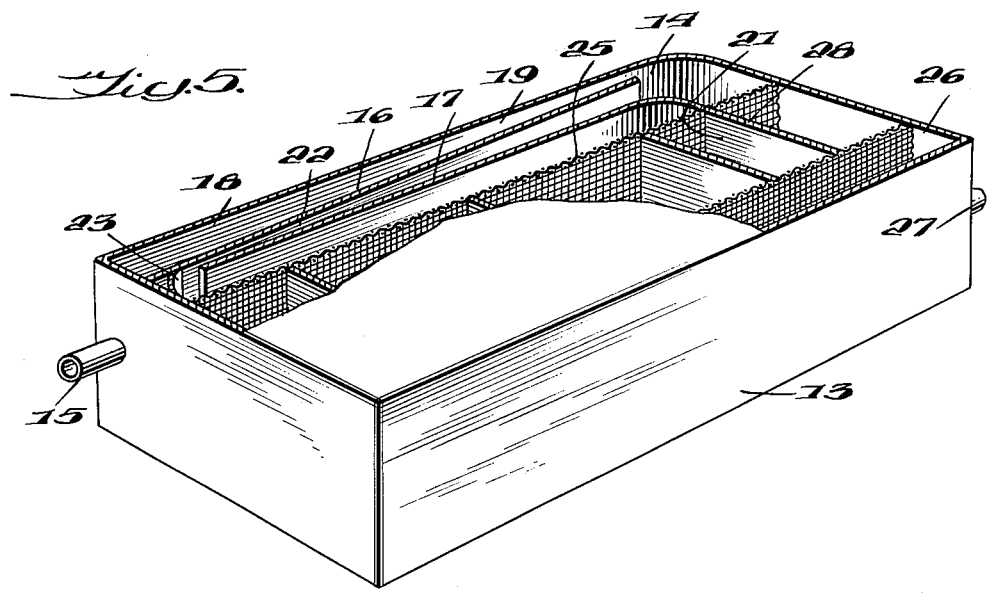
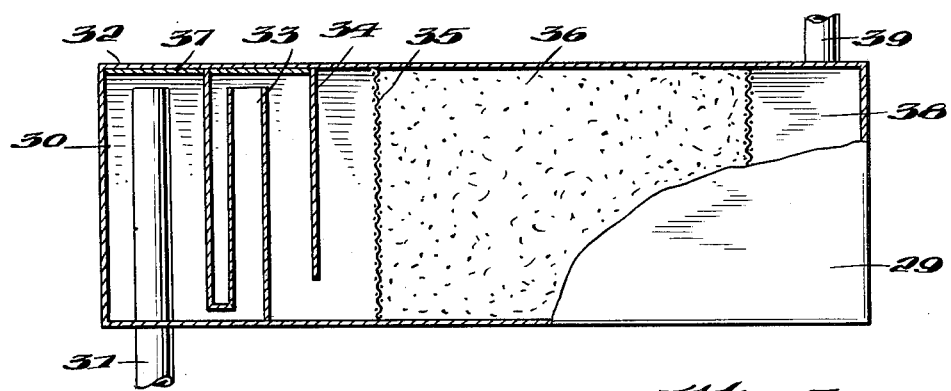
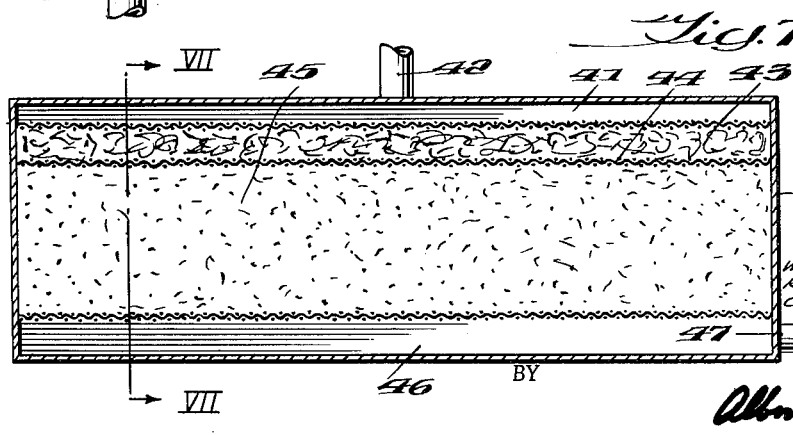
INVENTORS
WILLIAM B. HAYES,
ROBERT J. KALLAL,
CLIFFORD M.
SAYRE, JR.
BY
ATTORNEY

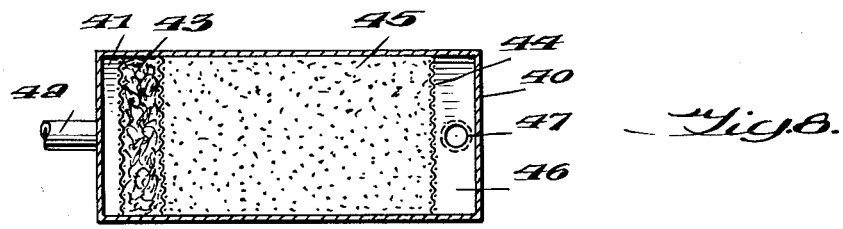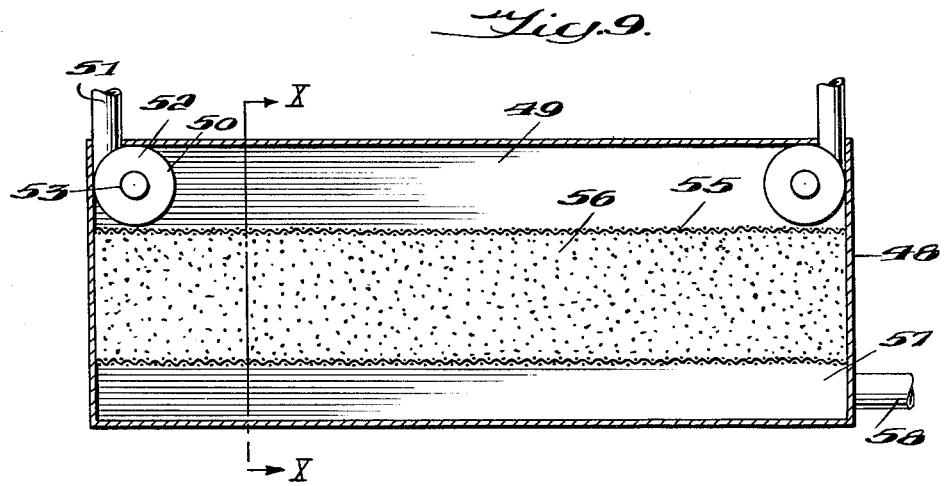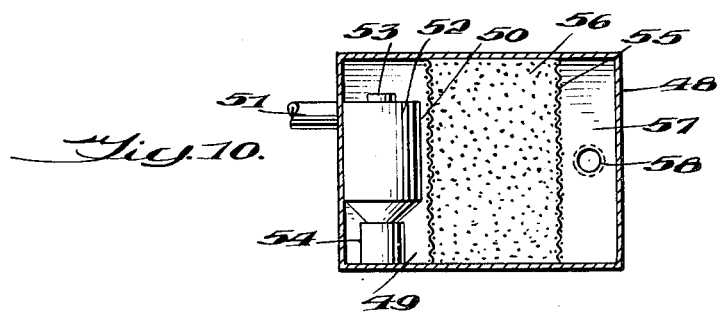

United States Patent Office 3,154,389
Patented Oct. 27, 1964

3,154,389
DEVICE FOR CATALYTIC EXHAUST TREATMENT
WITH PARTICLE SEPARATION
William Bell Hayes III, College Station, Tex., and Robert John Kallal and Clifford Morrill Sayre, Jr., Wilmington, Del., assignors to E. I. du Pont de Nemours and Company, Wilmington, Del., a corporation of Delaware
Filed Apr. 30, 1963, Ser. No. 277,418
2 Claims. (Cl. 23—288)

This invention relates to catalytic mufflers and a process for treating the exhaust gases of an internal combustion engine. More particularly this invention relates to novel catalytic mufflers and a process for removing finely divided particulate matter from the exhaust gases of an internal combustion engine.

One of the characteristics of exhaust gases is the presence of finely divided particulate matter. It has been observed in the treatment of the exhaust gases, by the use of a catalytic type afterburner, that the finely divided particulate matter is a substantial factor in the deactivation of the catalyst. These particles can materially complicate the solution of the noxious exhaust fume problem, particularly in the use of a catalytic muffler, for this material will deactivate some catalysts and in the case of any catalyst may serve to diminish the catalytic area available for treating the exhaust gases by depositing on the catalyst. It necessarily follows that the catalyst efficiency and life will be greatly impaired. It would therefore be beneficial to provide a means for removing finely divided particulate matter from the exhaust gases of internal combustion engines prior to contacting the gases with the catalyst so as to maintain catalyst efficiency and to prolong catalyst life.

It is an object of this invention to provide devices for removing finely divided solid particulate matter from the exhaust gases of an internal combustion engine.

It is a further object of this invention to provide in a catalytic muffler suitable means for removing finely divided particulate matter from the exhaust gases of an internal combustion engine prior to catalytically treating the gases to remove the noxious constituents so as to maintain catalyst efficiency and to prolong catalyst life.

It is a still further object of this invention to provide a process for removing finely divided particulate matter from the exhaust gases of an internal combustion engine. These and other objects appear hereinafter.

These and other objects are accomplished by this invention by providing a catalytic muffler comprising a separation chamber within the catalytic muffler having an inlet for exhaust gases containing finely divided solid particulate matter to remove the finely divided solid particulate matter from the exhaust gases, elements within the separation chamber to change the direction of flow of the exhaust gases, a catalyst chamber within the catalytic muffler to catalytically treat the exhaust gases, and an outlet for treated gases. Such a device will be described in detail hereinafter, reference being had to the accompanying drawings, wherein:

FIGURE 1 shows a top view of one embodiment of the catalytic muffler of this invention with the finely divided particulate matter shown concentrated in one corner of the catalyst bed after being in use, FIGURE 2 shows an end sectional view taken along line II—II of FIGURE 1, FIGURE 3 shows a top view of the preferred embodiment of this invention with the finely divided particulate matter shown concentrated in the corners after being in use, FIGURE 4 shows an end sectional view taken along line IV—IV of FIGURE 3, FIGURE 5 shows a perspective view of the preferred embodiment of this invention, FIGURE 6 shows a top view of another embodiment of this invention, FIGURE 7 shows a top view of a further embodiment of this invention, FIGURE 8 shows an end sectional view taken along line VII—VII of FIGURE 7, FIGURE 9 shows a top view of a still further embodiment of this invention, and FIGURE 10 shows an end sectional view taken along line X—X of FIGURE 9.

One embodiment of the catalytic muffler of this invention is shown in detail in FIGURES 1 and 2. In FIGURES 1 and 2, the exhaust gases containing the finely divided solid particulate matter enters into the catalytic muffler 1 through line 3. The exhaust gases containing the particulate matter are accelerated in the separation chamber 2 by a converging channel or nozzle 4 formed by the wall 5 of the catalytic muffler 1 and a solid plate 6 that converges from the point of entrance of the gases through line 3. The accelerated exhaust gases containing the particulate matter exit from the converging channel or nozzle 4 and by a change in direction affected by a curvature of the wall 5 of the catalytic muffler 1 the particulate matter in a concentrated form under the centrifugal force imparted is diverted to a predetermined sacrificial area 7 of the catalyst contained in the catalyst chamber 8. Perforated plates or screens 9 having a greater than 50% free area and each perforation having a diameter less than the diameter of the catalyst pellets, holds the catalyst within the catalyst chamber 8 and allows the untreated exhaust gases with the finely divided particulate matter essentially removed to enter the catalyst chamber 8 and the treated gases with the noxious constituents of the exhaust gases removed by contact with the catalyst to leave the catalyst chamber 8 to go into an exit chamber 10. The treated gases then vent to the atmosphere through line 11. Contained in the catalyst chamber 8 are four solid plates 12 which serve to direct the flowing gases through the catalyst bed.

The preferred embodiment of this invention is shown in detail in FIGURES 3, 4 and 5. In these figures the exhaust gases containing the finely divided solid particulate matter enters into the catalytic muffler 13 through line 15. Within the separation chamber 14 are two solid plates 16 and 17. Plate 16 and the wall 18 of the catalytic muffler 13 form a converging channel or nozzle 19 from the point of entrance of the gases through line 15. This converging channel or nozzle 19 accelerates the exhaust gases containing the particulate matter, and upon leaving this channel and by a change in the direction affected by a curvature of the wall 18 of the catalytic muffler 13, the particulate matter in a concentrated form and under the centrifugal force imparted is diverted to a predetermined sacrificial area 20 of the catalyst contained in the catalyst chamber 21. The second solid plate 17 together with plate 16 form a second converging channel or nozzle 22 opposite to the first converging channel or nozzle 19. This converging channel or nozzle 22 accelerates the exhaust gases containing any particulate matter not removed by the sacrificial area 20 of the catalyst. Upon leaving this converging channel or nozzle 22 and by a change in direction affected by a curved plate 23, the particulate matter in a concentrated form and under the centrifugal force imparted is diverted to a second predetermined sacrificial area 24 of the catalyst contained in the catalyst chamber 21. Perforated plates or screens 25 having a greater than 50% free area and each perforation having a diameter less than the diameter of the catalyst pellets holds the catalyst within the catalyst chamber 21 and allows the untreated exhaust gases with the finely divided particulate matter essentially removed to enter the catalyst chamber 21 and the treated gases with the noxious constituents of the exhaust gases removed by contact with the catalyst to leave the catalyst chamber 21 to go into an exit chamber 26. The treated gases then vent to the atmosphere through line 27. Contained in the catalyst chamber 21 are four solid plates 28 which serve to direct the flowing gases through the catalyst bed.

Another embodiment of this invention is shown in detail in FIGURE 6. In FIGURE 6 the exhaust gases containing the finely divided solid particulate matter enters into the separation chamber 30 within the catalytic muffler 29 through line 31. Within the separation chamber 30 are two impingement chambers arranged in series. The gases are first brought in thru line 31 at a high velocity and impinged against the wall 32 having fibrous surfaces 37 such as glass wool or asbestos woven as a tape adhered to it. The gases then back flow at a much lower velocity, allowing the finely divided solid particulate matter to settle out. The gases are then passed to the second impingement chamber thru line 33 where the same process takes place as in the first impingement chamber. The gases are then passed around baffle 34 into the catalyst chamber 36 through perforated plates or screens 35. Perforated plates or screens 35 having a greater than 50% free area and each perforation having a diameter less than the diameter of the catalyst pellets, holds the catalyst within the catalyst chamber 36 and allows the untreated exhaust gases with the finely divided solid particulate matter essentially removed to enter the catalyst chamber 36 and the treated gases with the noxious constituents of the exhaust gases removed by contact with the catalyst to leave the catalyst chamber 36 to go into an exit chamber 38. The treated gases then vent to the atmosphere through line 39.

A further embodiment of this invention is shown in detail in FIGURES 7 and 8. In these figures, the exhaust gases containing the finely divided solid particulate matter enters the catalytic muffler 40 through line 42 into a separation chamber having two chambers, a gas distribution chamber 41 and a chamber containing a filtering material 43. The filtering material 43, e.g. sixteen gauge wire nails, glass wool, aluminum spheres, or foraminous materials serves to impinge the particulate matter upon the surface of the filtering material 43 as the exhaust gases change direction of flow around the individual particles making up the filtering material. Perforated plates or screens 44 having a greater than 50% free area and each perforation having a diameter less than the diameter of the catalyst pellets, holds the catalyst within the catalyst chamber 45 and allows the untreated gases with the finely divided solid particulate matter essentially removed to enter the catalyst chamber 45 and the treated gases with the noxious constituents of the exhaust gases removed by contact with the catalyst to leave the catalyst chamber 45 to go into an exit chamber 46. The treated gases then vent to the atmosphere through line 47.

A still further embodiment of this invention is shown in detail in FIGURES 9 and 10. In these figures the exhaust gases containing the finely divided solid particulate matter enters the separation chamber 49 of the catalytic muffler 48 through two centrifugal separators 50. Each centrifugal separator 50 has a tangential line 51 in which the particulate matter laden exhaust gases enters a cylindrical or conical chamber 52. The particulate matter free exhaust gases exit through a central opening 53 into the separation chamber 49 while the particulate matter, by virtue of their inertia, will tend to move toward the outside separator wall from which they are led into a receiver 54. Perforated plates or screens 55 having a greater than 50% free area and each perforation having a diameter less than the diameter of the catalyst pellets holds the catalyst within the catalyst chamber 56 and allows the untreated gases with the finely divided solid particulate matter essentially removed to enter the catalyst chamber 56 and the treated gases with the noxious constituents of the exhaust gases removed by contact with the catalyst to leave the catalyst chamber 56 to go into an exit chamber 57. The treated gases then vent to the atmosphere through line 58.

The catalytic muffler should be so designed that it does not become too hot in operation as otherwise it will heat the floor of the motor vehicle as well as shorten the life of the catalyst. Not only may the catalytic muffler be rectangularly shaped as shown in the drawings, but it can be made oval in shape or otherwise altered to conform to the particular motor vehicle with which it is to be used. In all cases, the catalytic muffler for removing finely divided particulate matter incorporates a change of direction so that the exhaust gases lose the particulate matter by impingement prior to contacting the gases with the catalyst. The catalyst used in the catalyst chamber of the catalytic muffler may be any catalyst suitable for use in a device of this nature known in the art and readily available on the market, such as mixed metallic oxides.

The catalytic muffler of the present invention besides maintaining catalyst efficiency and prolonging catalyst life also has the advantages of acting as a very effective acoustical muffler which can be made at a low cost. Due to the low operating temperatures employed with the catalytic muffler of this invention, mild steel and the like rather than heat-resistant materials of construction often required can be used. The catalytic muffler of this invention has the additional advantage that the pressure drop is no greater than that experienced with a conventional acoustitcal muffler system.

As many apparently widely different embodiments of this invention may be made without departing from the spirit and scope thereof, it is to be understood that this invention is not limited to the specific embodiments thereof except as defined in the appended claims.

This application is a continuation-in-part of our application Serial No. 28,321, filed May 11, 1960, now abandoned.

The embodiments of the invention in which an exclusive property or privilege is claimed are defined as follows:

1. A catalytic muffler comprisnig, in combination, an enclosure having an inlet for exhaust gases containing finely divided solid particulate matter and an outlet for treated gases at the diagonally opposite end of said enclosure from said inlet; perforated plates vertically disposed within said enclosure and dividing said enclosure into a separation chamber, catalyst chamber and exit chamber; solid plates adjacently vertically disposed within said separation chamber to form oppositely converging channels in the direction of gas flow, the inlet to said separation chamber being at the wide end of said first converging channel; curved plates vertically disposed at the nozzle ends of said converging channels and adapted to divert said particulate matter as it emerges from said nozzle ends; solid plates vertically disposed within said catalyst chamber between and perpendicular to said perforated plates and dividing said catalyst chamber into a plurality of catalyst beds, the two end catalyst beds positioned to receive the particulate matter diverted by said curved plates and thereby removing said particulate matter from said exhaust gases prior to their contact with the other catalyst beds.

2. A catalytic muffler comprising, in combination, an enclosure having an inlet for exhaust gases containing finely divided solid particulate matter and an outlet for treated gases at the diagonally opposite end of said enclosure from said inlet; perforated plates vertically disposed within said enclosure and dividing said enclosure into a separation chamber, catalyst chamber and exit chamber; a solid plate vertically disposed within said separation chamber to form a converging channel from said inlet; a curved plate vertically disposed at the nozzle end of said converging channel and adapted to divert said particulate matter as it emerges from said nozzle; solid plates vertically disposed within said catalyst chamber between and perpendicular to said perforated plates and dividing said catalyst chamber into a plurality of catalyst beds, the catalyst bed positioned at the end of said curved plate adapted to receive the particulate matter diverted by said curved plate and thereby removing said particulate matter from said exhaust gases prior to their contact with the other catalyst beds.

References Cited in the file of this patent

UNITED STATES PATENTS

| | | |
|---|---|---|
| 1,402,814 | Wachtel | Jan. 10, 1922 |
| 1,538,652 | Poth | May 19, 1925 |
| 1,716,481 | Bilsky | June 11, 1929 |
| 1,867,325 | Neville | July 12, 1932 |
| 3,056,662 | Ridgway | Oct. 2, 1962 |

FOREIGN PATENTS

| | | |
|---|---|---|
| 413,967 | Great Britain | July 26, 1934 |